Feb. 5, 1957
J. G. RUSSELL
2,780,235
WEIGHT OPERATED PRE-CHECK MECHANISM
Filed July 17, 1953
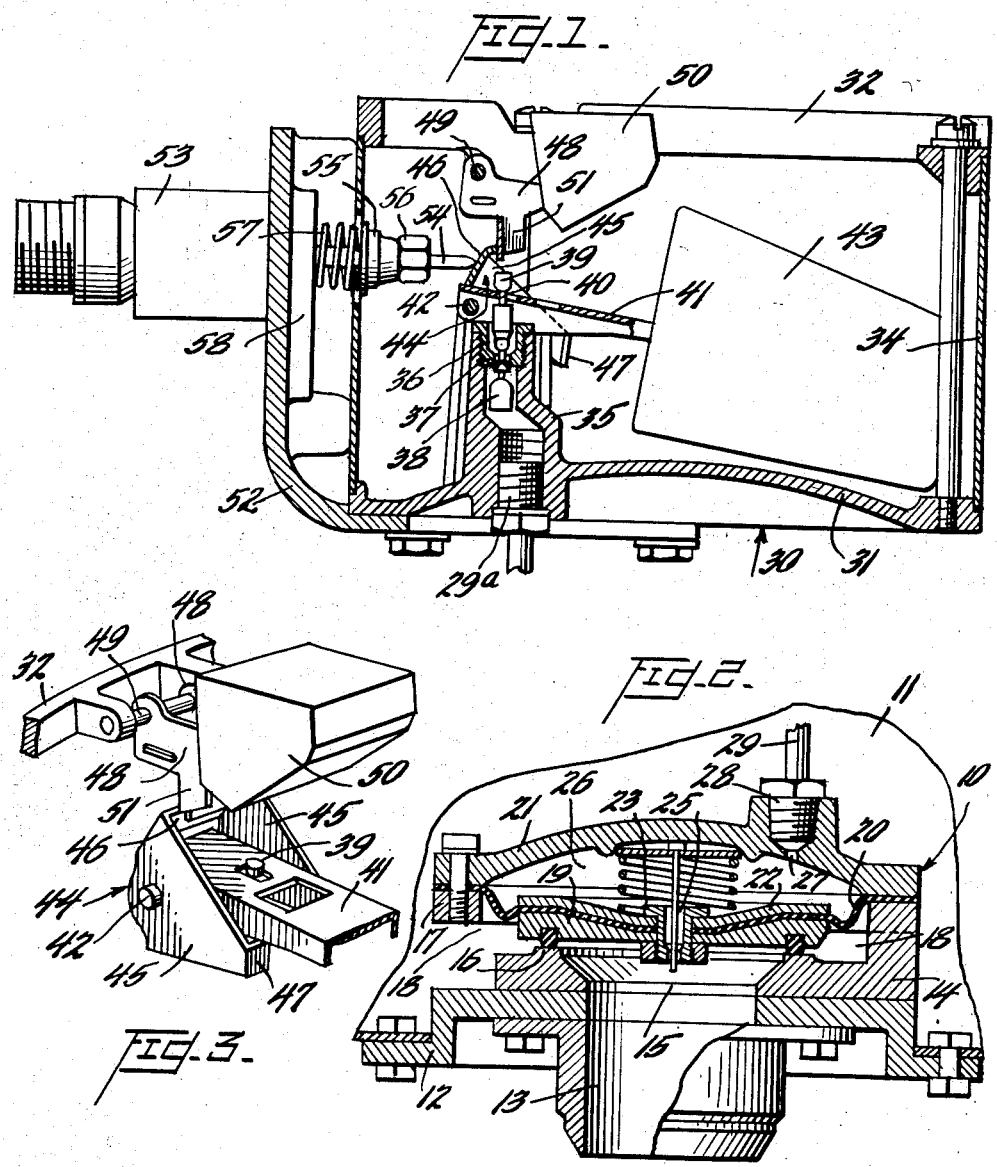
INVENTOR
John G. Russell,
BY Mason, Porter, Diller & Stewart
ATTORNEYS

United States Patent Office 2,780,235
Patented Feb. 5, 1957

2,780,235

WEIGHT OPERATED PRE-CHECK MECHANISM

John G. Russell, Cleveland, Ohio, assignor to The Parker Appliance Company, Cleveland, Ohio, a corporation of Ohio Application July 17, 1953, Serial No. 368,745

4 Claims. (Cl. 137—390)

The invention relates to a fluid pressure operated valve for the filling of tanks with which is associated a float controlled pilot valve operated to cause the fluid pressure to close the main valve when the fluid in the tank reaches a predetermined level.

An object of the present invention is to provide a manually controlled pre-check mechanism associated with the pilot valve for testing the operativeness of the float controlled lever to insure that it is functioning properly before filling the tank.

A further object of the invention is to provide a pre-check mechanism wherein a weight actuated rocker pivoted on the same center as the float lever contacts the lever from beneath when testing and raises the lever and closes the pilot valve.

A further object of the invention is to provide a pre-check mechanism wherein a weight actuated auxiliary rocker contacts the main rocker for raising the float lever when testing and a heavy tension spring operating on the main rocker overrides the weight and moves the main rocker out of contact with the float lever to permit normal operation of the said pilot valve.

These and other objects will in part be obvious and will in part be hereinafter more fully described.

In the illustrated embodiment of the invention:

Figure 1 is a vertical sectional view through the pilot operated valve with which is associated the pre-check mechanism for testing the functioning of the pilot valve before filling.

Figure 2 is a vertical sectional view through a well known form of fluid pressure operated valve mechanism with which the pilot valve of Figure 1 is associated.

Figure 3 is a perspective view showing the main rocker and the weight operated auxiliary vehicle in their relation to the float lever.

While the main fluid pressure operated valve indicated at 10 in Figure 2 is of the usual construction a brief description thereof will be given.

The fluid pressure valve 10 is mounted on the bottom wall of the tank 11. There is an opening in the bottom wall in which is located a plate 12 on which the housing of the fluid pressure operated valve is mounted. Attached to this plate 12 is a depending pipe line fitting 13 which is adapted to be connected by a suitable piping to a fuel supply system. This main valve includes a base plate 14 having an inlet port 15 surrounded by a valve seat 16. This base plate is attached to the plate 12 and the inlet 15 is in alignment with the depending pipe fitting 13. Formed as a part of the base plate 14 is a ring shaped member 17. This ring shaped member is spaced above the valve seat so as to provide ports 18 leading to the tank. A valve 19 is attached to a diaphragm 20 and the diaphragm is clamped against the ring 17 by means of a cap 21. There is a plate 22 on the upper side of the diaphragm. A headed sleeve 23 passes through the plate 22, the diaphragm and the valve 19. A nut is threaded onto the sleeve and clamps the valve to the diaphragm. There is a restricted opening 25 through the sleeve which connects the underside of the valve with the chamber 26 formed in the cap 21.

The cap has an opening 27 therethrough to which is attached an adapter 28. A pipe 29 is connected to the adapter 28 and leads to an adapter 29ª on the pilot valve 30. The pilot valve housing includes a lower member 31 and an upper member 32. A metal cover 34 is attached to the members 31 and 32 for enclosing the operating parts of the pilot valve mechanism. The lower member 31 has an upstanding sleeve 35 in which is threaded an adapter 36. The adapter is provided with an opening therethrough and at the lower portion of the adapter is a valve seat 37. A valve 38 disposed below the valve seat is movable upwardly into contact with the seat and this is the closed position of the pilot valve.

The pilot valve 38 is carried by a stem 39 having a reduced portion 40 which extends through an opening in the float lever 41. The float lever is preferably of sheet metal and is U-shaped in cross section. The side members of the float lever have openings through which a pivot pin 42 extends. On the outer end of the float lever is a float 43. This pilot unit specifically forms no part of the present invention and further description thereof is not thought necessary.

Associated with the pilot valve is a pre-check mechanism for determining the functioning of the pilot valve before filling the tank. This pre-check mechanism includes a lower rocker or swingably mounted main element 44 preferably made of sheet metal and shaped so as to provide side members 45 and a connecting cross member 46. These side members 45 of the rocker have openings through which the pivot pin 42 extends so that the rocker can oscillate on said pivot pin. These side members of the rocker also have members or parts 47 which project beneath the float lever. When the rocker is oscillated in a counter-clockwise direction it will raise the float lever and when oscillated in a clockwise direction it will free the float lever so that it can be moved up and down by the float. An auxiliary rocker 48 is mounted on a pivot pin 49 carried by lugs projecting downwardly from the upper member 32. Attached to the auxiliary rocker 48 is a weight 50, which when free to move forces a depending arm 51 of said rocker or swingably mounted weight actuated element 48 into contact with the cross member 46 of the main rocker, and this will cause the main rocker to be oscillated in a counter-clockwise direction, the float lever lifted to its extreme upper position and the pilot valve closed. Mounted on a bracket 52 is a solenoid 53. The rod 54 is an extension of the core of the solenoid. Integral with the rod is a collar 56. Threaded onto the midsection of the rod 54 is a nut 55 against which the spring 57 bears. The force of the spring may be varied by adjusting the position of the nut 55.

Under normal conditions the spring 57 forces the rod 54 into contact with the cross member 46 of the main rocker and moves the main rocker to the position shown in Figure 1. In this position the float is free to move, raising and lowering the float lever in accordance with the level of the liquid in the tank. Let us assume that it is desired to test the functioning of the pilot valve before filling. The solenoid is energized and this will withdraw the rod 54 from contact with the main rocker. The weight 50 will oscillate the auxiliary rocker 48 in a clockwise direction and the auxiliary rocker contacting the main rocker will oscillate the same in a counter-clockwise direction thus raising the float lever and closing the pilot valve. If the pilot valve is stuck so that it cannot be closed by the weight then the main valve will open and the operator will be warned that there is something preventing the proper functioning of the pilot valve. If, however, the weight closes the pilot valve then the main valve will be held closed by fluid pressure so that no fuel can be supplied to the tank. The operator will be advised that the pilot valve is functioning properly and he can deenergize the solenoid so that the spring 57 will support the weight in raised position and the float can operate normally to raise the pilot valve and close the same when the liquid in the tank reaches a predetermined level.

The pre-check mechanism described above may be used to advantage where a series of tanks are supplied from a single point. When each tank is equipped with the pre-check mechanism described the operator by energizing the solenoids can close the valves of selected tanks and fill only the tanks where the solenoids are not energized.

It is obvious that many changes in the details of construction may be made without departing from the spirit of the invention as set forth in the appended claims.

I claim:

1. A pre-check mechanism for a float controlled pilot valve having a valve closing lever carrying a float comprising a main device having members extending beneath the float lever and movable into engagement therewith for raising the lever, a weight actuated member adapted, when free to act, to move said main device and lift the float lever and close the pilot valve, an actuating device of greater energy than the weight for moving said main device out of lifting contact with the float lever and manually controlled power means for rendering said actuating device inactive so as to permit the weight actuated member to operate and close the pilot valve.

2. A pre-check mechanism for a float controlled pilot valve having a valve closing lever carrying a float comprising a main rocker having members extending beneath the float lever and movable into engagement therewith for raising the lever, an auxiliary rocker, a weight carried thereby and operating to move said auxiliary rocker into contact with the main rocker for moving the same and lifting the float lever and closing the pilot valve, an actuating device of greater energy than the weight for moving said main rocker out of lifting contact with the float lever, and manually controlled power means for rendering said actuating device inactive so as to permit the weight actuated member to operate and close the valve.

3. A pre-check mechanism for a float controlled pilot valve having a valve closing lever carrying a float comprising a main rocker having members extending beneath the float lever and movable into engagement therewith for raising the lever, an auxiliary rocker, a weight carried thereby and operating to move said auxiliary rocker into contact with the main rocker for moving the same and lifting the float lever and closing the pilot valve, an actuating device of greater energy than the weight for moving said main rocker out of lifting contact with the float lever, said actuating device including a rod, a spring for forcing said rod into engagement with the main rocker, and manually controlled power means for withdrawing the rod from engagement with the rocker whereby said actuating device will operate through the rocker to close the valve.

4. A pre-check mechanism for a float controlled pilot valve having a valve closing lever carrying a float comprising a swingably mounted main element having a part extending beneath the float lever and movable into engagement therewith for raising the lever and closing the pilot valve, a swingably mounted weight actuated element engaging the main element and adapted when free to act, to move said main element and lift the float lever and close the pilot valve, an actuating device of greater energy than the weight engageable with one said element to hold the main element out of lifting contact with the float lever, and manually controlled power means for rendering said actuating device inactive so as to permit the weight actuated element to move the main element to the pilot valve closing position.

References Cited in the file of this patent
UNITED STATES PATENTS

| | | |
|---|---|---|
| 476,573 | Stout | June 7, 1892 |
| 1,603,005 | Flam | Oct. 12, 1926 |
| 1,616,728 | Willoughby | Feb. 8, 1927 |
| 1,770,913 | Kermor | July 22, 1930 |
| 2,227,961 | Coughey | Jan. 7, 1941 |
| 2,591,030 | Versoy | Apr. 1, 1952 |
| 2,699,671 | More | Jan. 18, 1955 |